Patented Oct. 30, 1945

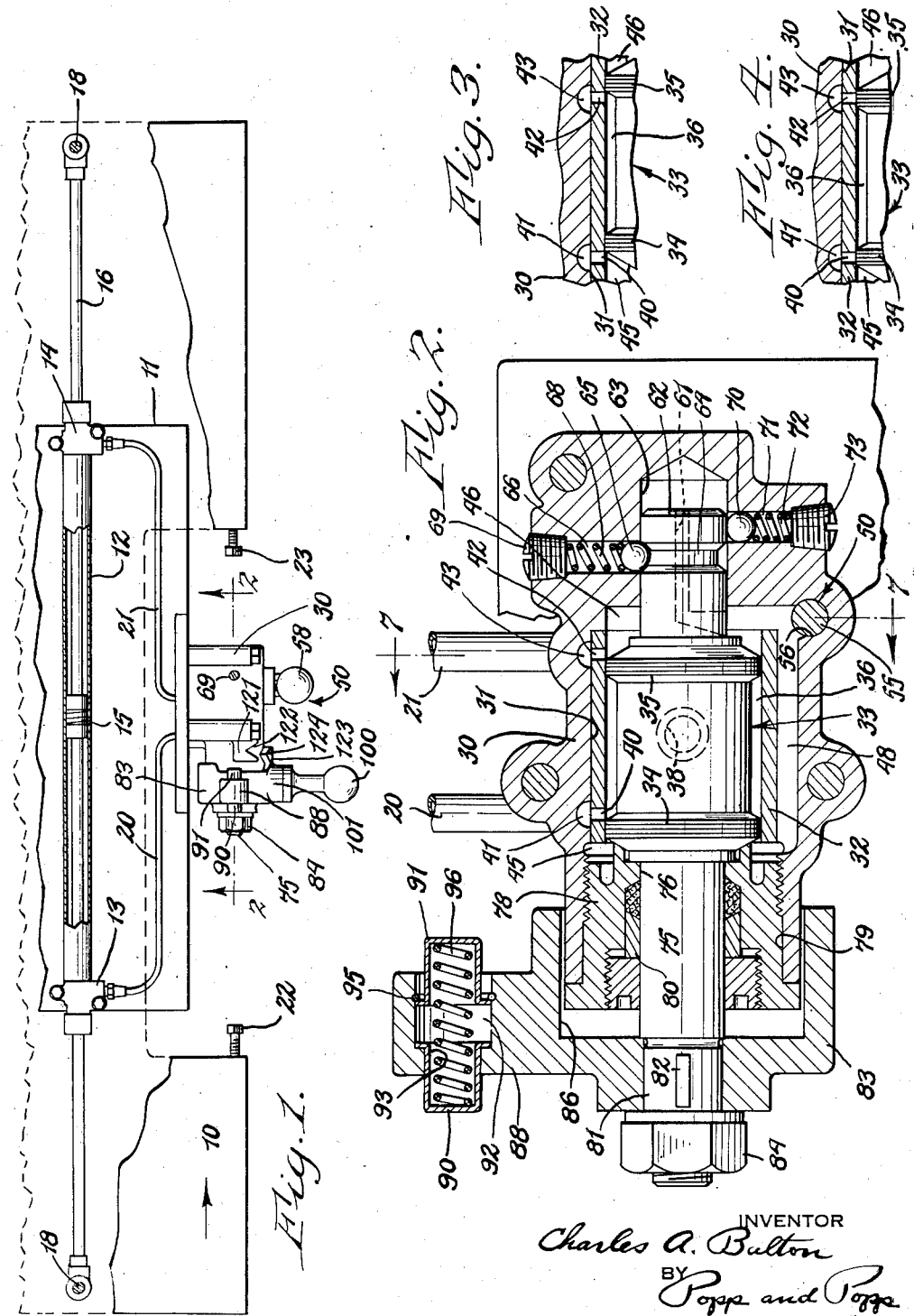

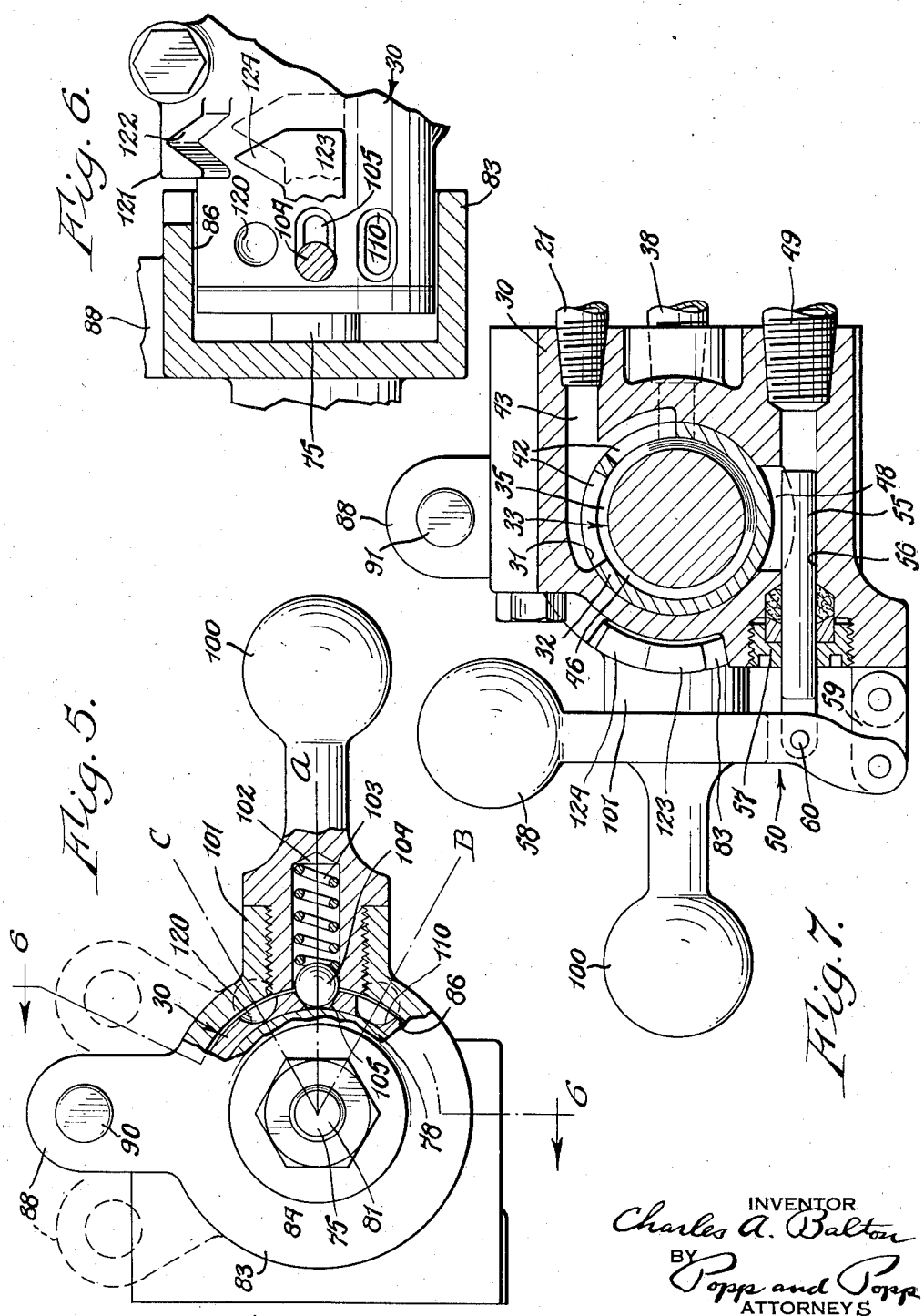

2,387,733

UNITED STATES PATENT OFFICE 2,387,733

QUICK-ACTING CONTROL VALVE

Charles A. Balton, Buffalo, N. Y., assignor to Sav-Way Industries, Detroit, Mich., a partnership Application August 31, 1943, Serial No. 500,681

8 Claims. (Cl. 121—45)

This invention relates to a quick acting control valve and more particularly to such a valve which is adapted to be used in conjunction with the driving piston of a reciprocating part to insure prompt reversal of the movement of the part at each end of its stroke, the valve also having a means for stopping the part at any position and also having a means for placing the reciprocation of the part under full manual control.

One of the objects of the invention is to provide a reversing valve controlling and actuated by the reciprocation of a part which reversing valve is extremely quick acting and free from any tendency to hesitate on dead center, the valve thereby being particularly useful in processes, such as in a reciprocating rotary grinder, where even a slight lag at the ends of each reciprocating stroke of the grinder would be highly detrimental.

Another object of the invention is to provide a simple control for placing the valve under full automatic operation; for placing it under full manual operation; and for arresting the action of the valve at any point thereby to stop the part being reciprocated at any point in its travel.

Another aim of the invention is to provide such a valve which can be adjusted to reciprocate the part under its control at any desired speed.

Another purpose is to provide such a control valve which is in the form of a single compact unitary structure of simple construction and which will stand up under conditions of severe and constant use without getting out of order or requiring repairs.

In the accompanying drawings:

Fig. 1 is a fragmentary top elevation of a machine having a table which is reciprocated by fluid pressure under a control valve embodying my invention.

Fig. 2 is an enlarged vertical section through the valve forming the subject of the invention and taken on line 2—2, Fig. 1.

Fig. 3 is a fragmentary radial section through the cylinder and piston of the valve and showing the piston in the position for effecting a reversal in the movement of the part or table to be reciprocated as compared with the position of this piston shown in Fig. 2.

Fig. 4 is a view similar to Fig. 3 and showing the position of the piston where all ports are closed so that all movement of the table or part to be reciprocated is arrested.

Fig. 5 is an end elevation of the valve, parts being shown in section.

Fig. 6 is a fragmentary vertical sectional view, taken on line 6—6, Fig. 5.

Fig. 7 is a vertical transverse sectional view through the valve, taken on line 7—7, Fig. 2.

While the use of the valve forming the subject of the present invention is not limited to any particular field, it is shown as used to reciprocate a horizontal table 10 slidingly mounted on a bed or standard 11, such as might be used in a horizontal reciprocating rotary grinder. A cylinder 12 is shown as mounted on the bed or standard 11 parallel with the line of reciprocation of the table 10 and this cylinder is shown as having end heads 13 and 14 through which fluid is admitted to and exhausted from the opposite ends of the cylinder to effect reciprocation of the piston 15 therein. The piston is fast to a piston rod 16 which extends through suitable glands or stuffing boxes provided in the end heads 13 and 14 and the opposite ends of the piston rod 16 can be secured to the table 10 in any suitable manner, as by stud bolts 18.

The fluid for reciprocating the table 10 is admitted to and relieved from the opposite end heads 13 and 14 of the cylinder through the valve embodying the present invention which can be mounted on the bed or standard 11 and is shown as connected with these end heads by fluid lines or conduits 20, 21. The reversal of the valve to effect a reversal in the movement of the table 10 is shown as obtained through a pair of horizontal axially aligned screws 22, 23 mounted on the table 10 and arranged to engage and reverse the parts of the valve at the end of each stroke of the table as hereinafter described, the adjustment of these screws 22, 23 determining the length of the stroke of the table.

The valve forming the subject of the present invention comprises a valve housing or casing 30 which can be secured to the bed or standard 11 of the machine in any suitable manner and is provided with a central bore 31 the axis of which is parallel to the line of movement of the table 10 and in which is fitted a liner or sleeve 32. In this liner or sleeve is slidingly mounted a plunger or piston indicated generally at 33, this piston having enlargements 34 and 35 at its opposite ends which carry piston rings fitting against the bore of the liner or sleeve 32 in the cylinder 31. These enlargements 34 and 35 at the opposite ends of the piston provide an annular chamber 36 therebetween and between the piston and the sleeve or liner 32 to which fluid under pressure is supplied from a fluid pressure supply line 38 connected with the valve body or casing 30 and communicating with this annular chamber 36.

The sleeve or liner 32 of the cylinder 31 is provided at one end with one or more ports 40 leading to a passage 41 in the valve body 30 which communicates with the line 20 leading to the end head 13 of the cylinder 12. Similar ports 42 are provided at the opposite end of the sleeve or liner 32 and lead to a passage 43 in the valve body 30 which communicates with the other line 21 leading to the other end head 14 of the cylinder 12. These ports 40 and 42 are spaced a distance equal to the spacing of the enlarged end portions 34 and 35 of the plunger 33 and it will therefore be seen that moving the plunger 33 axially to its extreme positions alternately places these ports in communication with the annular chamber 36 between the enlarged portions 34 and 35 of the plunger and since this annular chamber is continuously supplied with fluid under pressure by the supply line 38, it will be seen that fluid pressure is alternately supplied to opposite ends of the cylinder 12. It will also be seen that when the plunger 33 is held in a medial position, as shown in Fig. 4, where the ports 40 and 42 are covered by the enlarged end portions 34 and 35 of the plungers, no fluid is supplied to the cylinder 12 and hence the piston 15 therein will be stopped at any position upon moving the plunger 33 to the position shown in Fig. 4.

When fluid under pressure is so supplied to one end of the cylinder 12, the fluid in the opposite end of the cylinder must be relieved or exhausted therefrom in order to reciprocate the piston 15. For this purpose annular end chambers 45 and 46 are provided in the valve body 30 at the ends of the sleeve or liner 32 and these chambers are interconnected by a longitudinal passage 48 in the valve body along the outside of the sleeve or liner 32. The chamber 46 is also connected to a fluid discharge or exhaust line 49 under control of a valve indicated generally at 50.

Since the enlargements 34 and 35 on the plunger 33 are spaced the same distance as the ports 40 and 42 in the liner or sleeve 32 and are capable of being moved past these ports in both directions of movement of the plunger 33, it will be seen that when the plunger is moved to the extreme left, as viewed in Fig. 2, the ports 40 are connected with the annular chamber 36 containing fluid under line pressure from the supply line 38 and the ports 42 are connected with the annular end chamber 46 which is connected with the fluid discharge or exhaust line 49 through the valve 50. Consequently fluid under pressure flows from the supply line 38 through the annular chamber 36, ports 40, passage 41, line 20 and end head 13 into the left hand end of the cylinder 12. This drives its piston 15 to the right inasmuch as the fluid in the right hand end of the cylinder 12 flows out through the cylinder head 14, line 21, passage 43, ports 42, annular chamber 46 and past the valve 50 to the exhaust or discharge line 49. A reversal of the relation of the ports 40 and 42 takes place when the plunger 33 is moved to the extreme right, as shown in Fig. 3, and hence the piston 15 is driven in the opposite direction, or to the left.

The speed control valve 50 can be of any suitable construction to adjustably throttle the discharge of fluid into the outlet or discharge line 49 and is shown, by way of example, as comprising a valve rod 55 in a bore 56 leading axially to the fluid discharge or exhaust line 49 and communicating at one side with the annular chamber 46 and longitudinal passage 48. The rate of discharge is controlled by moving the valve rod 55 inwardly or outwardly thereby to restrict or enlarge the communication between the bore 56 and the annular chamber 46 and longitudinal passage 48. For this purpose the valve rod 55 extends outwardly from the valve body 30 through a gland or stuffing box 57 and is operated by a speed control handle 58 which has a link connection 59 with the valve body or casing 30 and has a pivotal connection 60 with the external end of the valve rod 55, as best shown in Fig. 7.

At its right hand end, as viewed in Fig. 2, the plunger 31 is provided coaxially with an extension or rod 62 fitting in a bore 63 in the valve body or casing 30, the extremity of this bore 63 being connected by a passage 61 with the annular discharge chamber 46 so as to avoid fluid being trapped in the bore 63 by the rod 62 and thereby rendering the plunger 33 inoperative. A short distance from the end of this rod 62 an annular ball groove 64 is provided. This groove has beveled or inclined sides and in the extreme left hand position of the plunger 33, this groove receives the inner half of a detent ball 65 which is arranged in a radial bore 66 in the valve body or casing 30 and is urged inwardly by a helical compression spring 68 removably held in the bore 66 by a screw plug 69 which closes the outer end of the bore. In the extreme right hand position of the plunger 33, as shown in Fig. 3, the ball groove 64 receives the inner half of a similar ball 70 which is arranged in a radial bore 71 in the valve body and is urged inwardly by a helical compression spring 72 removably held in the bore 71 by a screw plug 73 which closes the outer end of the bore. Because of the inclined sides of the ball groove 64, the plunger 33 can be reciprocated back and forth, the spring loaded balls 65 and 70 being alternately forced into and out of this groove. In either of the extreme positions of the plunger 33, the ball groove 64 is engaged by the ball 65 or the ball 70.

To reciprocate the plunger 33 in order to effect the above reciprocation of the piston 15, the left hand end of the plunger is provided with a plunger rod 75 which slides in a bore 76 provided in a valve head 78, this valve head being externally threaded and screwed into an internally threaded bore 79 provided at the left hand end of the valve body 30, as viewed in Fig. 2, and coaxially with and forming the end wall of the bore 31 in the valve body. This valve head 78 forms a stop for the left hand movement of the valve plunger 33, as viewed in Fig. 2, and also carries a gland or stuffing box 80 which surrounds and seals the plunger rod 75.

The outer end 81 of the plunger rod 75 is of reduced diameter and on this reduced end is fitted a head 83 which is connected thereto by a key 82 and a nut 84 on the threaded extremity of the plunger rod 75. The head 83 is cup-shaped having a bore 86 which embraces the adjacent cylindrical end of the valve body 30.

Projecting radially from one side of this reciprocating head 83 is a finger 88 which carries a pair of oppositely projecting spring loaded bumpers 90 and 91 which are arranged to be moved into the path of the screws 22 and 23 on the table 10 of the machine and are in axial alinement therewith. To mount the bumpers 90 and 91, as best shown in Fig. 2, an enlarged bore 92 is provided in one side of the finger 88, this bore leading to a smaller bore 93 which extends through the opposite side of the finger. Each of the bumpers 90 and 91 is in the form of a sheet metal cup having a radially outwardly extending flange which slidingly fits in the larger bore 92. The bumper 90 is fitted in the bore 93 with its flange against the shoulder provided by the bores 92 and 93 and with its closed end projecting outwardly from the finger 88 through the smaller bore 93. The other bumper 91 has its flange fitted in the larger bore 92 against the inside of a spring retaining ring 95 which is fitted in an annular groove provided in the larger bore 92. The closed end of the bumper projects outwardly from the finger 88 through the end of the larger bore 92 and the bumpers 90 and 91 are held in the distended relationship shown by a helical compression spring 96 interposed therebetween.

The entire plunger 33 and reciprocating end head 83 assembly is adapted to be manually turned about its axis to bring the bumpers 90 and 91 in axial alinement between the screws 22 and 23 on the table of the machine. For this purpose a handle 100 is provided, this handle being shown as being screwed into an internally threaded boss 101 projecting radially outward from the reciprocating head 83, as best shown in Fig. 5. The inner end of this handle 100 is shown as provided with a bore 102 which houses a helical compression spring 103 and a ball 104, this ball being urged by the spring into engagement with the valve body 30. When the bumpers 90 and 91 are in axial alinement with the screws 22 and 23, the inner half of the ball 104 fits in a longitudinal groove 105 provided on the exterior of the valve body 30 within the cup-shaped reciprocating head 83 from which the handle boss 101 projects. This groove 105, as best shown in Fig. 6, is of sufficient length to permit the axial movement of the plunger 33 from the extreme left hand position shown in Fig. 2 to the extreme right hand position shown in Fig. 3. It will therefore be seen that with the handle 100 in the horizontal position shown by the dot-dash line A in Fig. 5, on the left hand stroke of the piston 15, as viewed in Fig. 1, the screw 22 on the table of the machine will engage the bumper 90 and shift the head 83 and plunger 33 from the position shown in Fig. 2 to the position shown in Fig. 3. Similarly, on the right hand stroke of the piston 15, as viewed in Fig. 1, the screw 23 on the table of the machine will engage the bumper 91 and shift the head 83 and plunger 33 from the position shown in Fig. 3 to the position shown in Fig. 2. This is the full automatic operation position of the parts.

As best shown in Fig. 6, the valve body 30 is provided with a second external longitudinal groove 110 directly below the groove 105 and into which the ball 104 fits when the handle 100 is swung downwardly to the position indicated by the dot-dash line B in Fig. 5. When this is done the bumpers 90 and 91 are swung out of the path of the screws 22 and 23, the finger 88 carrying these bumpers being swung to the right, as indicated by dotted lines at the right of Fig. 5. In this position, through the handle 100, the head 83 and plunger 33 assembly can be axially moved manually from the left hand position shown in Fig. 2 to the right hand position shown in Fig. 3. In this "B" position of the handle 100, the parts are thereby placed in position for full manual control of the valve.

As best shown in Fig. 6, the valve body 30 is provided with a recess 120 directly above the groove 105 and into which the ball 104 fits when the handle 100 is swung upwardly to the position indicated by the dot-dash line C in Fig. 5. To insure this engagement between the ball 104 and the recess 120, the valve body 30, as best shown in Figs. 6 and 7, is provided with a lug 121 having a downwardly opening V-shaped recess 122 and the rim of the cup-shaped head 83 is provided with an axial extension 123, the upper side of which is formed to provide a V-shaped tooth 124 which is shaped to fit into the V-shaped recess 122. With the handle 100 in its full automatic horizontal position shown in Fig. 5, in either extreme axial position of the head 83 and plunger 33 assembly the tooth 124 is in either the full or dotted line position shown in Fig. 6. Upon now swinging the handle 100 upwardly, the V-shaped tooth 124 is caused to enter the recess 122 in the valve body and center itself therein. In this centered elevated position of the tooth 124, the ball 104 seats in the recess 120 thereby to hold the parts in this position until manually released. In this position of the parts, the valve plunger 33, because of the engagement between the V-shaped tooth 124 and the V-shaped recess 122, is held in the position shown in Fig. 4. Since in this position the ports 40 and 42 are closed, it will be seen that the action of all parts is stopped, this upward position of the handle 100 thereby being a stop position so that the reciprocation of the table 10 can be stopped at any point in its travel.

In the operation of the valve, and assuming that the parts are in the position shown in Figs. 1, 2 and 5–7, fluid under pressure from the supply line 38 flows into the annular chamber 36 between the enlargements 34 and 35 of the plunger 33 and since this plunger is in the left hand position shown in Fig. 2 this fluid flows out through the ports 40, passage 41, line 20 and end head 13 into the right hand end of the cylinder 12, as viewed in Fig. 1. This drives the piston 12 to the right, the fluid in the right hand end of the cylinder 13 flowing out through the end head 14 of the cylinder 12, line 21, passage 43, ports 42, annular exhaust chamber 46 and past valve 50 through the bore 56 into the fluid discharge or exhaust line 49. The rapidity of movement of the piston 15, and hence the table 10 connected therewith is determined by the adjustment of the valve 50 which can be of any suitable construction to throttle the discharge.

At the extreme right hand end of the stroke of the piston 15, the table 10 is moved to effect engagement between its screw 22 and the bumper 90 of the valve assembly. This bumper, as shown in Fig. 2, compresses its spring 96 until its pressure overcomes the resistance of the spring 68 which holds the ball 65 in the groove 64. When this occurs, the plunger 33 is suddenly moved to the right through mechanical pressure derived from the screw 22 against the bumper 90, finger 88, end head 83 and the plunger rod 75 of the plunger 33. This moves the plunger 33 to its extreme right hand position shown in Fig. 3, the spring loaded ball 65 riding out of the groove 64 and the spring loaded ball 70 riding into this groove to hold the plunger in the right hand position shown in Fig. 3 until mechanically reversed.

While the plunger 33 is so held in the right hand position shown in Fig. 3, the fluid from the fluid pressure supply line 38 flows through the annular chamber 36 around the central part of the plunger 33 and out through the ports 42, passage 43, line 21 and end head 14 into the right hand end of the cylinder 12. This drives the piston 15 therein to the left, the fluid in the left hand end of the cylinder 12 flowing out through the end head 13, line 20, passage 41, ports 40, annular end chamber 45, longitudinal passage 48 and annular end chamber 46 past the valve 50 and into the bore 56 and out through the fluid outlet or exhaust line 49.

Since the piston rod 16 of the piston 15 is connected with the table 10, this moves the table 10 to the left, as viewed in Fig. 1, until its screw 23 engages and compresses the bumper 91 against the resistance of its helical compression spring 96. This pressure is transmitted axially through the finger 88, head 83 and plunger rod 75 to the plunger 33 and when the pressure of the helical compression spring 96 builds up high enough to overcome the spring 72 behind the ball 70, the plunger is returned to its left hand position shown in Fig. 2. This returns the parts to the position assumed at the start of the operation, this cycle being repeated thereby to reciprocate the table 10 back and forth the distance determined by the spacing of the screws 22 and 23 and at a speed determined by the adjustment of the valve 50 which throttles the discharge of the fluid.

An important feature of the invention resides in the compression of the helical compression bumper spring 96 until it overcomes the resistance of the springs 68 or 72 behind the balls 65 or 70, following which the plunger 33 snaps axially from one extreme position to the other. This avoids any dead center characteristics in the control valve and insures against any lag in the reversal of movement of the table 10 in either direction. This is particularly important in such applications as a reciprocating grinder where a lag at the ends of the strokes would result in excessive grinding of the ends of the piece being operated upon.

The above describes the full automatic operation of the valve. When it is desired to have the movement of the table 10 under full manual control, the handle 100 is thrown downwardly to the B position shown in Fig. 5. In so doing the spring loaded ball 104 is snapped out of the groove 105 and into the groove 110. Since this groove 110 is similar to the groove 105, the head 83 and plunger 33 assembly can still be moved axially to effect reversal of the movement of the piston 15 and table 10 as above described, but since in the B position of the handle 100 the bumpers 90, 91 are moved out of the path of the screws 22, 23 on the table 10, this reversal is no longer effected automatically by the table 10 at the end of each stroke thereof. Instead the direction of movement of the table 10 is under full manual control. Thus in the B position of the handle 100, the operator can manually move this handle to the left, as viewed in Figs. 1 and 2, thereby to set the plunger 33 in the left hand position shown in Fig. 2, in which position the piston 15 and table 10 will be driven to the left as previously described. Similarly, the operator can move the handle 100 to the right thereby to set the plunger 33 in the right hand position shown in Fig. 3, in which position the piston 15 will be driven to the right, as previously described. Also, of course, the operator could set the handle 100 at the center, thereby to set the plunger 33 in the position shown in Fig. 4, in which position the ports 40 and 42 are covered and the piston 15 and table 10 stopped. However, the stopping of the piston 15 and table 10 is preferably effected by swinging the handle 100 up to its C position.

In so swinging the handle 100 up to its stop or C position, the ball 104 is forced out of the groove 105 or 110, depending upon whether it is moved from its A or its B position, and snaps into the recess 120. This rotates the head 83 and plunger 33 assembly relative to the valve body 30 and causes the V-shaped tooth 124 on the head 83 to enter and center itself in the V-shaped recess in the valve body 30. In this centered position, the plunger 33 is held in the centered position shown in Fig. 4 and in this position the ports 40 and 42 are covered, this cutting off all flow of fluid so that the piston 15 and table 10 are arrested in the position occupied when the handle 100 is so thrown to the C position.

From the foregoing it will be seen that the present invention provides a very simple, compact and reliable reversing valve mechanism, in which dead centricity is avoided so as to effect the desired reversal rapidly and without lag. Further, the speed of reciprocation of the part being controlled is easily regulated, and the valve mechanism can readily be adjusted to place the part being regulated under full automatic or full manual control as well as to stop the part in any point of its travel.

I claim as my invention:

1. A reversing valve mechanism for a part reciprocated by a piston in a cylinder and having spaced stops to determine the length of the stroke of said part, comprising a valve body having a cylindrical bore arranged parallel with the line of movement of said part, fluid lines connecting said bore with the opposite ends of said cylinder, a fluid pressure line and a fluid exhaust line connected with said bore, a plunger in said bore and slidable axially to one extreme position to connect said fluid pressure line with one of said fluid lines and to connect the other of said fluid lines with said fluid exhaust line and slidable axially to its opposite extreme position to reverse the connection between said fluid lines and said fluid pressure and fluid exhaust lines, spring loaded detent means arranged in said valve body and yieldingly holding said plunger in either of its extreme positions, a stem fast to and extending coaxially from one end of said plunger and extending outwardly from said valve body, a lateral extension fast to the outer end of said stem and interposed between said stops, and coaxial spring loaded buffer means mounted on opposite sides of said extension and projecting laterally outward therefrom parallel with the axis of said stem and arranged in the path of said stops, said spring loaded buffer means engaging a corresponding stop at the end of each stroke of said part thereby to reverse the position of said plunger and to reverse the direction of movement of said part, said spring loaded buffer means being stressed a degree sufficient to overcome the yielding resistance of said detent means before shifting said plunger from one extreme position to the other thereby to provide a quick acting reversal in its position.

2. A reversing valve mechanism for a part reciprocated by a piston in a cylinder and having spaced stops to determine the length of the stroke of said part, comprising a valve body having a cylindrical bore arranged parallel with the line of movement of said part, fluid lines connecting said bore with the opposite ends of said cylinder, a fluid pressure line and a fluid exhaust line connected with said bore, a plunger in said bore and slidable axially to one extreme position to connect said fluid pressure line with one of said fluid lines and to connect the other of said fluid lines with said fluid exhaust line and slidable axially to its opposite extreme position to reverse the connection between said fluid lines and said fluid pressure and fluid exhaust lines, spring loaded detent means arranged in said valve body and yieldingly holding said plunger in either of its extreme positions, a stem fast to and extending coaxially from one end of said plunger and extending outwardly from said valve body, a lateral extension fast to the outer end of said stem and interposed between said stops, and spring loaded buffer means mounted on said extension and arranged in the path of said stops, said spring loaded buffer means engaging a corresponding stop at the end of each stroke of said part thereby to reverse the position of said plunger and to reverse the direction of movement of said part, said spring loaded buffer means comprising a pair of cup-shaped members slidingly mounted in a bore provided in said extension in line with said stops and with their closed ends projecting outwardly from said last bore and a helical compression spring interposed between said cup-shaped members and holding them distended, said helical compression spring being stressed a degree sufficient to overcome the yielding resistance of said detent means before shifting said plunger from one extreme position to the other thereby to provide a quick acting reversal in its position.

3. A reversing valve mechanism for a part reciprocated by a piston in a cylinder and having spaced stops to determine the length of the stroke of said part, comprising a valve body having a cylindrical bore arranged parallel with the line of movement of said part, fluid lines connecting said bore with the opposite ends of said cylinder, a fluid pressure line and a fluid exhaust line connected with said bore, a plunger in said bore and slidable axially to one extreme position to connect said fluid pressure line with one of said fluid lines and to connect the other of said fluid lines with said fluid exhaust line and slidable axially to its opposite extreme position to reverse the connection between said fluid lines and said fluid pressure and fluid exhaust lines, a stem fast to and extending coaxially from one end of said plunger and extending exteriorly of said valve body, a lateral extension fast to the outer end of said stem and having its end interposed between said stops, said plunger, stem and extension providing a unitary structure capable of both axial and rotary movement relative to the axis of said plunger, said extension engaging a corresponding stop at the end of each stroke of said part to reverse the axial position of said plunger and thereby reverse the direction of movement of said part, manual means for rotating said assembly to move said extension out of the path of said stops and detent means interposed between said assembly and valve body for holding said extension in its positions both in and out of the path of said stops.

4. A reversing valve mechanism for a part reciprocated by a piston in a cylinder and having spaced stops to determine the length of the stroke of said part, comprising a cylindrical valve body having a coaxial bore arranged parallel with the line of movement of said part, fluid lines connecting said bore with opposite ends of said cylinder, a fluid pressure line and a fluid exhaust line connected with said bore, a plunger in said bore slidable axially to one extreme position to connect said fluid pressure line with one of said fluid lines and to connect the other of said fluid lines with said fluid exhaust line and slidable axially to its opposite extreme position to reverse the connection between said fluid lines and said fluid pressure and fluid exhaust lines, a stem fast to and extending coaxially from one end of said plunger and extending exteriorly of said valve body, a cup-shaped head fast to the outer end of said stem and having its rim fitting about the corresponding end of said valve body, a radial extension on said head and having its end interposed between said stops, said extension engaging a corresponding stop at the end of each stroke of said part to reverse the axial position of said plunger and thereby reverse the direction of movement of said part, manual means for rotating said head to move said extension out of the path of said stops, and detent means interposed between the interior of the rim of said cup-shaped head and the adjacent periphery of said valve body for holding said extension in its positions both in and out of the path of said stops.

5. A reversing valve mechanism for a part reciprocated by a piston in a cylinder and having spaced stops to determine the length of the stroke of said part, comprising a cylindrical valve body having a coaxial bore arranged parallel with the line of movement of said part, fluid lines connecting said bore with opposite ends of said cylinder, a fluid pressure line and a fluid exhaust line connected with said bore, a plunger in said bore and slidable axially to one extreme position to connect said fluid pressure line with one of said fluid lines and to connect the other of said fluid lines with said fluid exhaust line and slidable axially to its opposite extreme position to reverse the connection between said fluid lines and said fluid pressure and fluid exhaust lines, a stem fast to and extending coaxially from one end of said plunger and extending exteriorly of said valve body, a cup-shaped head fast to the outer end of said stem and having its rim fitting about the corresponding end of said valve body, a radial extension on said head and having its end interposed between said stops, said extension engaging a corresponding stop at the end of each stroke of said part to reverse the axial position of said plunger and thereby reverse the direction of movement of said part, manual means for rotating said head to move said extension out of the path of said stops, and detent means interposed between the internal cylindrical face of the rim of said cup-shaped head and the adjacent cylindrical external face of said valve body for holding said extension in its positions both in and out of the path of said stops and comprising a pair of radially spaced grooves provided in one of said cylindrical faces and a spring loaded member projecting from the other cylindrical face and adapted to engage said grooves in said positions of said extensions, said grooves extending parallel with the axis of said plunger and being of sufficient length to permit axial movement of said plunger from its said one extreme position to the other.

6. A reversing valve mechanism for a part reciprocated by a piston in a cylinder and having spaced stops to determine the length of the stroke of said part, comprising a valve body having a cylindrical bore arranged parallel with the line of movement of said part, a plunger arranged in said cylindrical bore and having end enlargements in engagement therewith, said plunger having a reduced central portion providing an annular chamber means and said valve body being formed to provide a connected annular chamber means at each end of said plunger, a fluid pressure line connected with one of said annular chamber means, a fluid exhaust line connected with the other of said annular chamber means, said valve body being provided with a pair of ports spaced from each other axially of said bore a distance equal to the spacing of said end enlargements of said plunger, a fluid line connecting each of said ports with a corresponding end of said cylinder, said enlargements in a central position of said plunger covering said ports and said plunger being slidable to one extreme position to connect one of said ports with one of said annular chamber means and the other of said ports with the other of said annular chamber means and said plunger being slidable axially to its opposite extreme position to reverse the connection between said ports and annular chamber means, a stem fast to and extending coaxially from one end of said plunger and extending exteriorly of said valve body, a lateral extension fast to the outer end of said stem, said plunger, stem and extension providing a unitary structure capable of both axial and rotary movement relative to the axis of said plunger, said extension engaging a corresponding stop at the end of each stroke of said part to reverse the position of said plunger and thereby reverse the direction of movement of said part, manual means for rotating said assembly to move said extension out of the path of said stops, and cam means interposed between said assembly and said valve means for shifting said plunger to said central position when so manually rotated thereby to bring said enlargements of said plunger into register with said ports and stop the flow of fluid therethrough.

7. A reversing valve mechanism for a part reciprocated by a piston in a cylinder and having spaced stops to determine the length of the stroke of said part, comprising a valve body having a cylindrical bore arranged parallel with the line of movement of said part, a plunger arranged in said cylindrical bore and having end enlargements in engagement therewith, said plunger having a reduced central portion providing an annular chamber means and said valve body being formed to provide a connected annular chamber means at each end of said plunger, a fluid pressure line connected with one of said annular chamber means, a fluid exhaust line connected with the other of said annular chamber means, said valve body being provided with a pair of ports spaced from each other axially of said bore a distance equal to the spacing of said end enlargements of said plunger, a fluid line connecting each of said ports with a corresponding end of said cylinder, said enlargements in a central position of said plunger covering said ports and said plunger being slidable to one extreme position to connect one of said ports with one of said annular chamber means and the other of said ports with the other of said annular chamber means and said plunger being slidable axially to its opposite extreme position to reverse the connection between said ports and annular chamber means, a stem fast to and extending coaxially from one end of said plunger and extending exteriorly of said valve body, a lateral extension fast to the outer end of said stem, said plunger, stem and extension providing a unitary structure capable of both axial and rotary movement relative to the axis of said plunger, said extension engaging a corresponding stop at the end of each stroke of said part to reverse the position of said plunger and thereby reverse the direction of movement of said part, manual means for rotating said assembly to move said extension out of the path of said stops, cam means interposed between said assembly and said valve means for shifting said plunger to said central position when so manually rotated thereby to bring said enlargements of said plunger into register with said ports and stop the flow of fluid therethrough, and detent means interposed between said assembly and valve body for holding said extension in its positions both in and out of the path of said stops.

8. A reversing valve mechanism for a part reciprocated by a piston in a cylinder and having spaced stops to determine the length of the stroke of said part, comprising a cylindrical valve body having a coaxial bore arranged parallel with the line of movement of said part, a plunger arranged in said cylindrical bore and having end enlargements in engagement therewith, said plunger having a reduced central portion providing an annular chamber means and said valve body being formed to provide an interconnected annular chamber means at opposite ends of said plunger, a fluid pressure line connected with one of said annular chamber means, a fluid exhaust line connected with the other of said annular chamber means, said valve body being provided with a pair of ports spaced from each other axially of said bore a distance equal to the spacing of said end enlargements of said plunger, a fluid line connecting each of said ports with a corresponding end of said cylinder, said enlargements in a central position of said plunger registering with said ports and said plunger being slidable to one extreme position to connect one of said ports with one of said annular chamber means and the other of said ports with the other of said annular chamber means and said plunger being slidable axially to its opposite extreme position to reverse the connection between said ports and annular chamber means, a stem fast to and extending coaxially from one end of said plunger and extending exteriorly of said valve body, a cup-shaped head fast to the outer end of said stem and having its rim embracing the corresponding end of said valve body, a radial extension on said head and having its end interposed between said stops, said extension engaging a corresponding stop at the end of each stroke of said part to reverse the axial position of said plunger from one extreme to the other and thereby reverse the direction of movement of said part, manual means for rotating said cup-shaped head to move said extension out of the path of said stops and V-shaped cooperating cam and recess means provided on said valve body and the rim of said cup-shaped head for shifting said plunger to said central position when so manually rotated thereby to bring said enlargements of said plunger into register with said ports and stop the flow of fluid therethrough.

CHARLES A. BALTON.